(12) United States Patent
Antonini

(10) Patent No.: US 8,119,213 B2
(45) Date of Patent: *Feb. 21, 2012

(54) ELASTOMERIC FILM

(76) Inventor: Fred A. Antonini, Fort Worth, TX (US)

( * ) Notice: Subject to any disclaimer, the term of this patent is extended or adjusted under 35 U.S.C. 154(b) by 698 days.

This patent is subject to a terminal disclaimer.

(21) Appl. No.: 11/072,382

(22) Filed: Mar. 4, 2005

(65) Prior Publication Data

US 2006/0198978 A1 Sep. 7, 2006

Related U.S. Application Data

(63) Continuation-in-part of application No. 10/523,942, filed on Feb. 8, 2005.

(51) Int. Cl.
*B32B 3/00* (2006.01)
*B32B 9/00* (2006.01)
*B65B 65/02* (2006.01)
*H04M 1/14* (2006.01)

(52) U.S. Cl. ...... 428/40.1; 428/42.1; 428/156; 428/187; 150/154; 150/165; 455/575.8

(58) Field of Classification Search ................. 428/40.1, 428/41.7, 41.8, 156, 167, 42.1, 187; 2/21, 2/161.3; 294/25; 473/201–206, 298–303; 400/715; 248/118, 118.1; D14/458; 150/154, 150/165; 455/575.8

See application file for complete search history.

(56) References Cited

U.S. PATENT DOCUMENTS

| | | | |
|---|---|---|---|
| 4,302,852 A | 12/1981 | Joung | |
| 4,552,713 A | 11/1985 | Cavicchioli | |
| 4,986,496 A | 1/1991 | Marentic et al. | |
| 5,054,063 A | 10/1991 | Lo et al. | |
| 5,300,171 A * | 4/1994 | Braun et al. | 156/249 |
| 5,508,084 A | 4/1996 | Reeves et al. | |
| 5,948,707 A | 9/1999 | Crawley et al. | |
| 6,130,945 A | 10/2000 | Shin | |
| 6,270,902 B1 | 8/2001 | Tedeschi et al. | |
| 6,372,323 B1 * | 4/2002 | Kobe et al. | 428/119 |
| 6,383,607 B1 * | 5/2002 | Shin | 428/172 |
| 6,465,091 B1 * | 10/2002 | Ou-Yang | 428/352 |
| 6,564,397 B1 | 5/2003 | Hawley et al. | |
| 6,840,836 B1 * | 1/2005 | Siverson | 446/46 |
| 6,960,272 B1 * | 11/2005 | Tokas et al. | 156/96 |

OTHER PUBLICATIONS

Request for Continued Examination dated Nov. 5, 2010 from corresponding U.S. Appl. No. 10/523,942.
Amendment under 37 CFR 1.114 dated Nov. 15, 2010 from corresponding U.S. Appl. No. 10/523,942.
Decision on Appeal dated Sep. 9, 2010 from corresponding U.S. Appl. No. 10/523,942.
Request for Continued Examination dated May 18, 2010 from corresponding U.S. Appl. No. 10/524,367.
Amendment under 37 CFR 1.114 dated May 18, 2010 from corresponding U.S. Appl. No. 10/524,367.
Office Action dated Oct. 4, 2010 from corresponding U.S. Appl. No. 10/524,367.

* cited by examiner

*Primary Examiner* — Patricia Nordmeyer
(74) *Attorney, Agent, or Firm* — James E. Walton; Richard G. Eldredge

(57) ABSTRACT

An anti-slip film is produced by combining a thin, dimensionally stable plastic film having a smooth surface finish with a silicone elastomer having a low durometer and a textured and polished surface finish. The film may include adhesive means for adhering the film to objects, and label stock for displaying graphical and/or textual indicia.

1 Claim, 3 Drawing Sheets

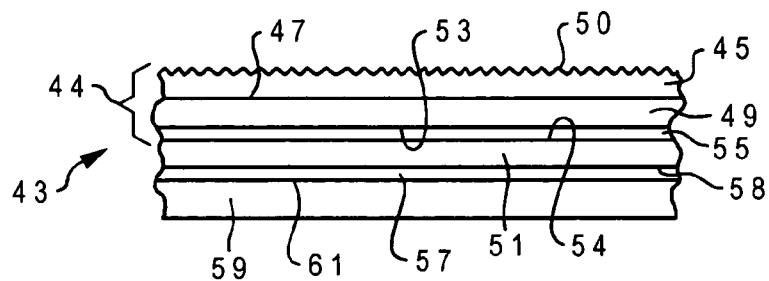
Fig. 5
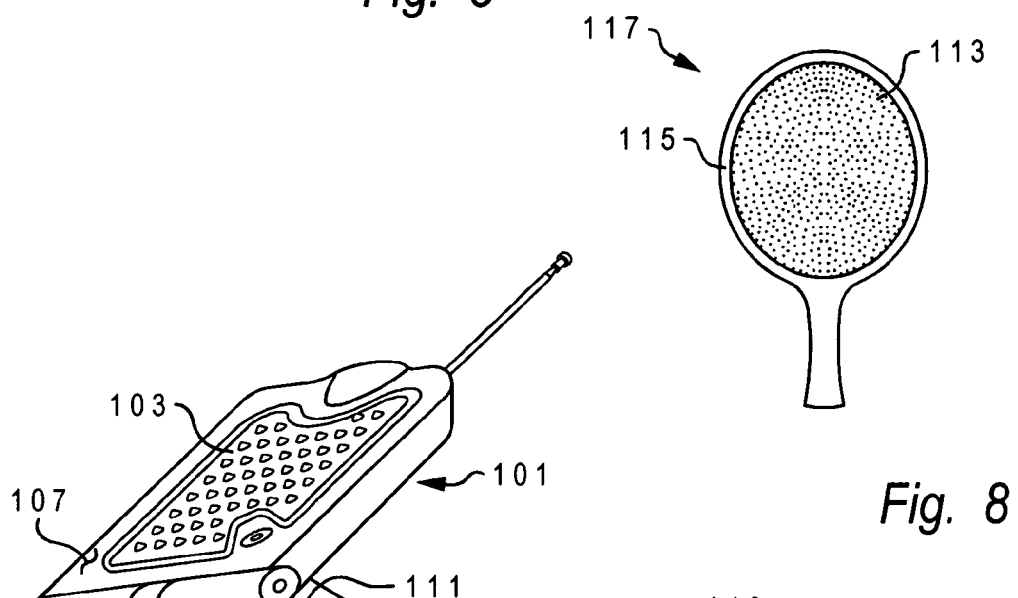
Fig. 7
Fig. 8
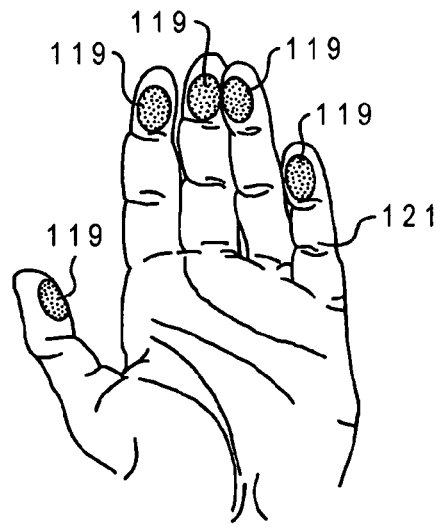
Fig. 9

ELASTOMERIC FILM

This application is a continuation-in-part of U.S. application Ser. No. 10/523,942, filed 8 Feb. 2005, titled "Silicone-Elastomer Film and Method of Making Same."

BACKGROUND OF THE INVENTION

1. Field of the Invention

The present invention relates to thin film silicone elastomers and methods of manufacturing thin film silicone elastomers.

2. Description of Related Art

Most handheld electronic devices, such as cellular telephones, camcorders, cameras, computer-based digital cameras, CD and MP3 players, PDA's, remote controls, notebook computers, tablet PC's, video games, video game controllers, hair trimmers and shears, and a wide variety of other handheld electronic devices, including carrying cases and pouches for these devices, have housings that are made of hard, smooth materials, such as plastic and metal. Although some of these devices include hand grips and/or small rubberized components, they typically do not include any anti-slip material over a large portion of their housings. This is a problem, because when a user handles one of these devices, the slightest amount of mishandling can allow the device to slip out of the user's hand, which can lead to the device being dropped and damaged. In addition, when these devices are placed on a table or other surface, such as the dashboard of a vehicle, they are vulnerable to sliding or being knocked off onto the floor or ground, which can lead to breakage or permanent damage.

Most handheld electronic devices have housings that are made of hard, smooth plastic or metal. The front faces of these housings usually include ornamental shapes and designs, but the rear faces are typically plain and smooth. Often, the rear, side, and bottom surfaces include switches, buttons, and access ports for receiving interchangeable components, batteries, and carrying cases. These switches, buttons, and access ports leave exposed joints, seams, and grooves. Flip-type and swivel telephones also include integral plastic and metal hinges and swivels.

In addition, many of these handheld electronic devices are configured to fit on top of other components or into accessory components, such as caddies, cradles, chargers, docking stations, computer monitors, carrying cases, and clips. When coupled together, there is usually very little clearance between the device and the accessory component. As a result, it is not possible to place a thick, anti-slip material directly onto the device, as doing so would prevent or impede the device from properly mating with its accessory component.

In addition to adding anti-slip functionality to handheld electronic devices, there are many other applications in which anti-slip functionality is desired. For example, in the printing industry, it is desirable to have rollers and other paper handling components that have high gripping capacity and that are highly durable. There are countless other material handling examples across many other industries in which it is desirable to have durable, anti-slip functionality.

Also, many applications exist in the sport and recreation industries. For example, many sports require the use of handheld equipment, such as bats, rackets, paddles, sticks, and other devices with gripping surfaces. In these sports, it is usually desirable to have anti-slip functionality associated with this equipment. In addition to handheld equipment, there are many sporting and recreation applications in which it is desirable that there be anti-slip functionality between a users clothing and his equipment.

Although there have been significant developments over the years in the area of producing thin elastomers, considerable shortcomings remain.

SUMMARY OF THE INVENTION

There is a need for a thin film having a silicone elastomer coating for use as an anti-slip skin, grip, or applique that can be applied to various items.

Therefore, it is an object of the present invention to provide a thin film having a silicone elastomer coating or layer applied to one surface of the film and a method for producing the film.

This object is achieved by providing a thin, dimensionally stable, smooth plastic film, disposing a silicone elastomer onto the plastic film, and imparting a polished surface finish to the silicone elastomer. In the preferred embodiment, the polished surface finish is imparted to the silicone elastomer by a casting means, such as a casting film, the plastic film-silicone elastomer assembly is cured, and the casting means is removed.

The present invention provides significant advantages, including: (1) stability of the elastomer as related to processing and use is provided; (2) a stabilized bonding surface for applying to other materials is provided; and (3) the ability to efficiently handle a very thin elastomeric coating having a very low durometer is provided.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which:

FIG. 5 is a side view of a third embodiment of the film of the present invention, the film having adhesive layers and a label stock added;

FIG. 7 is a perspective view of a handheld electronic device, the device having films of the present invention applied to outer surfaces of the device for use as anti-slip skins;

FIG. 8 is a front view of a ping-pong paddle having a film of the present invention applied to the striking surface of the paddle; and FIG. 9 is a front view of a hand having films of the present invention applied to the fingertips for use as anti-sip skins.

DETAILED DESCRIPTION OF THE PREFERRED EMBODIMENT

Figure 1:
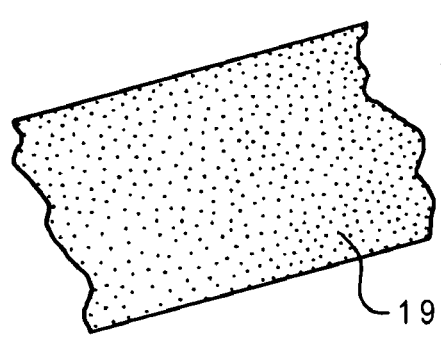
FIG. 1 is a perspective view of a film of the present invention.

While the making and using of various embodiments of the present invention are discussed in detail below, it will be appreciated that the present invention provides many applicable inventive concepts that can be embodied in a wide variety of specific contexts. The specific embodiments discussed herein are merely illustrative of exemplary ways to make and use the invention, and do not limit the scope of the invention. It should be noted that the layers in the figures are not drawn to scale.

The present invention is directed to a thin, soft, silicone elastomer film for use as an anti-slip skin, or applique. The skin can be applied, adhered, sewn, or otherwise attached to objects, a person's skin, the clothing of a user, or placed between objects, all of which act to prevent or reduce undesired relative motion between adjacent objects.

According to the present invention, a silicone elastomer is bonded to a thin, dimensionally stable plastic film substrate to form a flexible, thin film, referred to herein as a "silicone-elastomer film." It has been found that the use of a silicone material having a low-durometer, i.e., less than 40 on the Shore A scale, and a dimensionally stable, smooth, plastic film having a surface energy of about 40 Dynes/cm, provides the best results. It will be appreciated that many thin plastic films are not dimensionally stable. This configuration overcomes many of the problems associated with thin elastomeric sheets. For example, with the silicone-elastomer film of the present invention, the silicone elastomer is stabilized and prevented from "stretching" and sliding off the surface to which it is applied. In addition, an inexpensive acrylic pressure sensitive adhesive may be used to bond the silicone-elastomer film to other surfaces.

The silicone-elastomer film is durable, resilient, and capable of adhering to a suitable acrylic pressure sensitive adhesive. In the preferred embodiment of the present invention, the silicone elastomer is applied to the plastic film. Then, a textured and polished surface finish is imparted to the silicone elastomer by a casting means having a polished surface finish. This process creates a textured and polished surface finish on the silicone elastomer. The phrase "surface finish" will be used herein to describe the surface of materials on a very fine, or microscopic, scale; whereas the phrase "surface texture" will be used to describe the surface of materials on a larger scale, i.e., to indicate the presence of raised bumps, dimples, or ridges that can be seen with the naked eye and felt by hand.

The production of a silicone elastomer with a polished and textured surface finish represents a significant discovery in the present invention. It has been found that the use of such a silicone elastomer greatly improves the performance characteristics of the silicone-elastomer film. An equally important discovery in the present invention is the production and use of the thin, dimensionally stable, smooth plastic film substrate. These discoveries provide significant benefits, including: (1) the casting means releases cleanly from the silicone elastomer after curing; (2) the silicone elastomer is significantly more "grippy," i.e., has a higher coefficient of friction with more anti-slip functionality; and (3) the silicone elastomer is resistant to collecting dust and debris.

Figure 3:
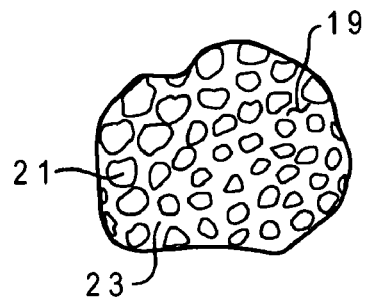
FIG. 3 is an enlarged view of a section of the film of FIG. 1, the surface texture being visible.
Figure 2:
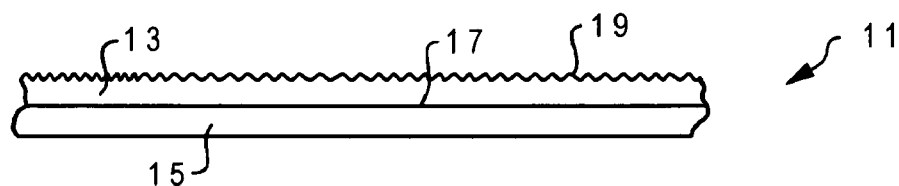
FIG. 2 is a side view of a film according to the invention.

Referring to FIGS. 1 through 3 in the drawings, the preferred embodiment of a silicone-elastomer film 11 according to the present invention is illustrated. As shown in FIG. 1, film 11 is formed as a sheet, and may be formed as a continuous sheet on a roll (not shown). FIG. 2 is a side view of film 11 showing a two-layer construction of film 11, in which a layer of silicone elastomer 13 having an exposed surface 19 with a polished surface finish is disposed on an upper surface 17 of a thin plastic film substrate 15. FIG. 3 is an enlarged view showing the pattern of the surface texture shown in FIGS. 1 and 2, with upraised bubble-shaped dimples 21 being separated by narrow valleys 23.

As explained above, the textured and polished surface finish of silicone-elastomer film 11 is preferably formed by a casting means, such as a casting film, having a polished surface finish. It will be appreciated that the surface finish of surface 19 of silicone elastomer 13 may also be formed by other means, such as tools, dies, or rollers; provided that such means imparts, imprints, or transfers, the desired textured and polished surface finish to silicone elastomer 13. Surface 19 is preferably formed to have a surface texture or pattern, as shown, although surface 19 may alternatively be matte or smooth. It has been found that, in some instances, the surface texture of surface 19 does not contribute significantly to the anti-slip functionality of film 11; however, certain surface textures do hide imperfections in film 11 and prevent dust and debris, which are easily seen on matte and smooth surfaces, from collecting on surface 19. This improves the look and feel of silicone-elastomer film 11.

Plastic film substrate 15 is a thin, flexible film, preferably a clear film about 0.002 inches thick, that forms and provides a flexible, durable, dimensionally stable substrate. It is preferred that plastic film 15 have a smooth surface finish, as may be attained with a co-extrusion process, and have a surface energy lower than about 40 Dynes/cm. This combination ensures a strong bond between plastic film 15 and silicone elastomer 13. This unique bond prevents silicone elastomer 13 from easily being detached from plastic film 15 during manufacture and use of film 11. For aesthetic purposes, plastic film 15 and/or silicone elastomer 13 may be tinted or may include embedded or printed graphical indicia. It is preferred that the combined thickness of silicone-elastomer film 11 be no greater than about 0.032 inches.

Silicone elastomer 13 is formed to have a low-durometer, i.e., less than 40 on the Shore A scale. This, along with the inherent bonding characteristics of silicone materials, facilitates bonding with plastic film 15. Silicone 13 may be applied to plastic film 15 by pouring, spraying, spreading, doping, or any other conventional application means suitable for applying a silicone material to solid sheets or films. However, as described below, the preferred method of applying silicone elastomer 13 to plastic film 15 is by controlled pouring in a continuous production process in which silicone elastomer 13 is sandwiched between plastic film 15 and a casting means having a textured and polished surface finish.

Figure 4:
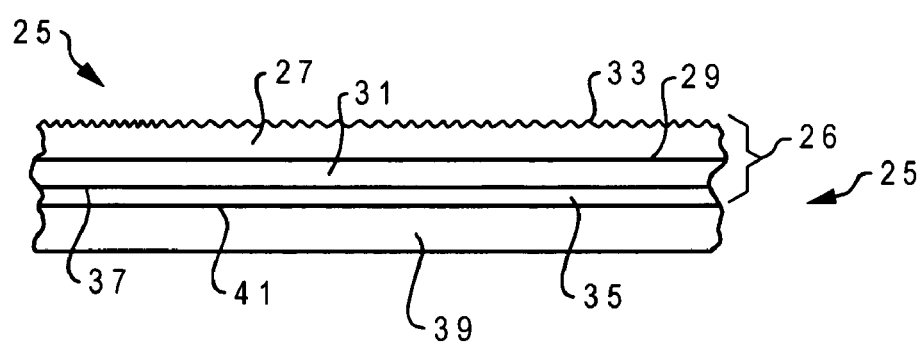
FIG. 4 is a side view of a second embodiment of the film of the present invention, the film having an adhesive layer added.

Referring now to FIG. 4 in the drawings, an alternative embodiment of the film of the present invention is illustrated. In this embodiment, a film 25 has an upper portion 26 that has the same construction as film 11 described above, in that a silicone elastomer 27 is applied onto an upper surface 29 of plastic film 31. As such, silicone elastomer 27 has an exposed surface 33 with a textured and polished surface finish. To provide a means of affixing film 25 to an object, a layer of adhesive 35 is applied to a lower surface 37 of plastic film 31, and a release liner 39 is placed against surface 41 of adhesive 35 for preventing contamination or setting of adhesive 35 prior to installation of film 25. Plastic film 31 provides a suitable base for which to bond adhesive layer 35, as it has been found that it is difficult to obtain a durable bond directly between adhesives and cured silicone materials. Adhesive 35 may be applied as a tape by other appropriate means, such as in liquid form. Prior to use, release liner 39 is removed from adhesive 35, allowing film 25 to be adhered to a surface.

Referring now to FIG. 5 in the drawings, a second alternative embodiment of the film of the present invention is illustrated. In this embodiment, a film 43 has an upper portion 44 that has the same construction as film 11 described above, in that a silicone elastomer 45 is applied onto an upper surface 47 of a plastic film 49. As such, silicone elastomer 45 has an exposed surface 50 with a textured and polished surface finish. A label stock 51, which may include graphical and/or textual indicia or other desired items, is adhered to a lower surface 53 of plastic film 49 by applying an adhesive layer 55 to an upper surface 54 of label stock 51. This allows any graphical indicia on label stock 51 to be visible through silicone elastomer 45 and plastic film 49. To allow for application of film 43 to a surface, a second adhesive layer 57 is applied to a lower surface 58 of label stock 51, and a release liner 59 is applied onto a lower surface 61 of adhesive layer 57.

Figure 6:
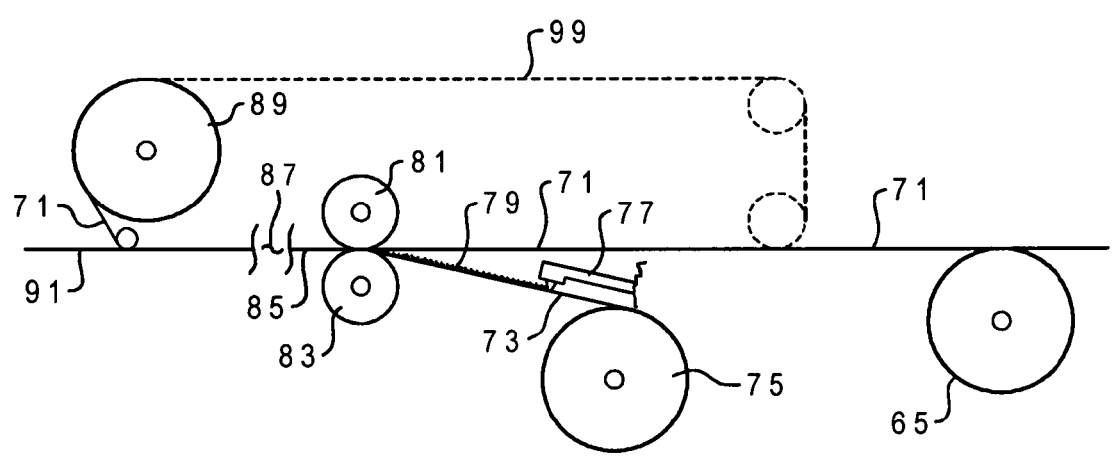
FIG. 6 is a side view schematically illustrating the method used to manufacture the film of FIG. 1.

Referring now to FIG. 6 in the drawings, the preferred method of manufacturing a silicone-elastomer film 91 according to the present invention is schematically illustrated. The first step in the process is to form or provide a casting means, such as a casting film 71, that is adapted to transfer a textured and polished surface finish to the silicone elastomer. Casting film 71 may be formed by a wide variety of conventional means for forming such films. The production of casting film 71 may be an integral part of the process of manufacturing silicone-elastomer film 11, or casting film 71 may be produced in a separate process prior to use in an off-site facility and stored in sheets or rolls 65. This allows casting film 71 to endure the heat of the curing process described below without undergoing any undesirable changes in shape, dimensions, or composition.

Casting film 71 is conveyed toward one or more nipping, or pinch, rollers 81, 83. At the same time, a plastic film substrate 73, which is preferably stored in a roll 75, is also conveyed toward nipping rollers 81, 83. Due to the thinness of plastic film 73, it is preferred that plastic film 73 be heat stabilized prior to use. This heat stabilization ensures that plastic film 73 can endure the heat cycle of the curing process without cockling or buckling. This prior heat stabilization of plastic film 73 is not typical of plastic films.

Before casting film 71 and plastic film 73 are drawn through nipping rollers 81, 83, a volume of silicone elastomer 79 is disposed on the upper surface of plastic film 73, preferably in liquid form by a nozzle 77, or a similar device. Then, plastic substrate 73, casting film 71, and silicone elastomer 79 are drawn between nipping rollers 81, 83. This causes silicone elastomer 79 to spread evenly at a selected thickness over plastic film 73 and transfers the textured and polished surface finish of casting film 71 to the exposed surface of silicone elastomer 79. This nipping process forms a film assembly 85 that is then subjected to a curing process, which is indicated by area 87 in the FIG. 6. Curing process 87 may include raised temperatures and pressures for varying durations of time. The specific temperatures, pressures, and cure times may vary depending upon the specific characteristics that are desired in the final film. It will be appreciated that other layers of materials, such as adhesives, label stocks, and release liners, may also be combined with film assembly 85, and that these other layers may be added before or after curing process 87.

Next, casting film 71 is removed from film assembly 85 and captured on roller 89, leaving a completed silicone-elastomer film 91 having a textured and polished surface finish according to the present invention. Once manufactured in sheet form, silicone-elastomer film 91 may be configured for a wide variety of uses and applications, by cutting, shaping, and other post-processing steps.

In an alternative method of manufacture, casting film 71 is reused after it is removed from film assembly 85. This embodiment is represented by the phantom lines in FIG. 6. In this embodiment, a film return loop 99 is provided so that casting film 71 may be returned to a location in the process prior to passage through nipping rollers 81, 83.

The production method shown in the figures and described above is only one example of a configuration for manufacturing the silicone-elastomer films 91 according to the present invention. The feed paths of casting film 71 and plastic film 73 may be configured in a variety of ways to achieve the same results. For example, the positions of the feed paths of casting film 71 and plastic film 73 may be reversed, with silicone elastomer 79 being applied to casting film 71, rather than plastic film 73, prior to nipping rollers 81, 83. Another possible configuration has the feed paths of casting film 71 and plastic film 73 in generally vertical orientations.

Referring now to FIGS. 7 through 9 in the drawings, some possible uses of the silicone-elastomer film of the present invention will now be described with respect to the configuration of FIG. 4. Because silicone-elastomer film 25 is typically formed as a sheet, a user may cut or otherwise shape portions of the sheet to create desired shapes and sizes of film 25. The user then removes release liner 39 from adhesive 35, and applies each film 25 to a selected surface. Film 25 then acts as an anti-slip applique for preventing or reducing movement of the selected surface relative to an adjacent surface.

In FIG. 7, a handheld electronic device 101, in this instance a mobile telephone, onto which silicone-elastomer films 103, 105 are adhesively affixed for use as anti-slip skins, is shown. Skin 103 is applied to an outer surface 107 of device 101, and skin 105 is applied to outer surfaces 109, 111. The outer surface of each skin 103, 105 is preferably formed to have a bubble pattern texture and polished surface finish, as shown in FIG. 3 and described above. Skins 103, 105 provide anti-slip functionality when device 101 is placed against other objects or surfaces because the exposed silicone material of skins 103, 105 grips the adjacent surfaces.

In FIG. 8, a silicone-elastomer film 113 according to the present invention is shown applied to the striking surface 115 of a ping-pong paddle 117. Silicone-Specification elastomer film 113 ensures a good lateral grip between paddle 117 and a ball (not shown) struck by the paddle, thereby enhancing the ability of the user to impart spin on the ball when striking the ball. It will be appreciated that the silicone-elastomer films of the present invention may be used on a wide variety of sporting equipment and in a wide variety of recreational applications.

In FIG. 9, a silicone-elastomer film 119 is shown in another use. Film 119 has been configured into small shapes for application to a user's fingertips 121. This provides for high levels of grip between fingertips 121 and objects being manipulated by the user. For example, films 119 may be used to allow the user to more easily pull sheets of paper from a stack, or to count money. An advantage of using films 119 in this application is that fingertips 121 are not fully enclosed, as with thimble-type fingertip appliances. This allows the user's fingers to "breathe," and prevents the user from feeling discomfort from heat buildup around fingertips 121.

The potential applications of the present invention go far beyond the uses mentioned above. The silicone-elastomer film according to the present invention may be used in many different applications across a wide variety of industries, particularly when configured, cut, shaped, and formed for specific applications. For example, the present invention may also be used as follows: (1) as an outer surface of a sleeve for a printer roller or other paper handling equipment; (2) as a self adhesive "hand pad" for weight lifters; (3) as a grip for flashlights; (4) as pads for eyeglass nosepieces; (5) as strips to be applied to the bottom of tool trays to keep tools from sliding; (6) as "barefoot" footwear; and (7) as an anti-slip skin for medical devices.

In other applications, the film according to the present invention can be used as an applique for, or sewn into, uniforms, clothing, or gear. For example, in motocross, when riders grip their handlebars for long periods of time, their hands and arms become fatigued. The film of the present invention may be placed on the riders pants to allow the rider to periodically grip the motorcycle with his legs. This helps relieve the fatigue in the rider's hands and arms. It will be appreciated that the present invention has additional applications in the motocross industry.

In an alternate embodiment, the silicone elastomer is disposed on both sides of the plastic film. This can be done, for example, by either coating both sides of the plastic film, or by adhering two silicone-elastomer films together back to back. This configuration allows for anti-slip functionality on both sides of the silicone-elastomer film, and allows the use of the present invention in applications in which it is undesirable to adhere the silicone-elastomer film directly to an object.

In another alternate embodiment, substrate 15 and release liners 39 and 59 of films 11, 25, and 43, respectively are configured or treated to allow films 11, 25, and 43 to be more easily manufactured and stored in rolls. In this embodiment, substrate 15 and release liners 39 and 59 are configured or coated, treated, or otherwise prepared to quickly and easily release from the exposed elastomeric surfaces when films 11, 25, and 43 are rolled up. The configuration or treatment of substrate 15 and release liners 39 and 59 ensures that the adjacent layers of films 11, 25, and 43 that are formed by capturing films 11, 25, and 43 into rolls do not stick together. There are significant advantages to treating both sides of substrate 15 and release liners 39 and 59, or by making substrate 15 and release liners 39 and 59 out of selected releasable materials, including: (1) the shelf life of films 11, 25, and 43 can be greatly extended; (2) additional dimensional stability is added; (3) waste is greatly reduced; (4) films 11, 25, and 43 can be captured on rolls faster and easier; (5) wrinkling and cockling is prevented.

The present invention may be used in wide variety of applications. The films of the present invention may be used to protect the windshields, windows, mirrors, and other breakable or scratchable parts on vehicles in storage or transport, including automobiles, motorcycles, boats, and aircraft, to name few. In such applications, the silicone elastomer surface clings to the surface to which it is applied and the substrate material protects the surface from scratching and other damage. The silicone elastomer material can be quickly and easily removed, and does not leave any residue on the surface when removed.

In another application, a sheet of silicone elastomer film is placed over a keyboard-type touchpad to provide anti-slip functionality and tactile feedback to the user. This embodiment can be used to replace the LEXAN sheets that are currently placed over flat touchpads. For example, the silicone elastomer material is applied to a label stock and the label stock is then applied to a membrane-type switch to provide tactile feed back. It will be appreciated that the silicone elastomer material can have a selected surface finish that allows the user to tactilely identify certain keys and locations on the touchpad. In addition, the film may include raised portions over the switches to allow a snap-type feedback. In another version of this embodiment, small individual pieces of the silicone elastomer film are placed on the tops of individual keys of keyboards to provide anti-slip functionality to the user.

In yet another application, the film of the present invention may be used as a fastening device. In this embodiment, a silicone elastomer fastening film is adhered to a first device, and an adhesive backed plastic film is adhered to a second device. When the silicone fastening film is brought into contact with the plastic film, the soft silicone elastomer material wets out on the plastic film causing the second device to remain quasi-fastened to the first device. This embodiment of the present invention is particularly well suited for applications in which sun and heat are factors, such as securing devices to a car dashboard, for example, storing a tire pressure gauge on the dashboard of an automobile.

In another application, the silicone elastomer film of the present invention may be used as a mouse pad. In this application, a small sheet of film is placed face-down on a surface. The exposed silicone elastomer material prevents the sheet from moving relative to the surface, but allows quick and easy removal without leaving an adhesive residue. Because the plastic substrate is very smooth with a very low coefficient of friction, a highly lubricious mousing surface is formed. A user can then move a mouse or other pointing device over the plastic surface with little or no drag or resistance. However, the texture of the silicone elastomer does transfer through the plastic film providing a desirable smooth texture. This embodiment is ideal for precision pointing devices.

It is apparent that an invention with significant advantages has been described and illustrated. Although the present invention is shown in a limited number of forms, it is not limited to just those forms, but is amenable to various changes and modifications without departing from the spirit thereof.

I claim:

1. An anti-slip film for a cellular phone having at least one hard, smooth exterior surface with a low coefficient of friction, the anti-slip film comprising:
    a clear dimensionally stable, thin plastic film having:
        a surface energy of about 40 Dynes/cm;
        an upper surface; and
        a lower surface;
    a thin layer of clear non-stretchable silicone elastomer adhesively bonded to the upper surface of the thin plastic film, the thin layer of silicone elastomer being adapted to retain a dimensionally stable shape, the layer of silicone elastomer having:
        a durometer of less than 40 on the shore A scale, and
        an exposed top surface with a casted textured and polished surface finish the exposed top surface creating a high coefficient of friction relative to a hard surface which the cellular phone is placed thereupon so as to prevent slipping;
    a first adhesive layer bonded to the lower surface of the plastic film; and
    a separate layer of label stock having:
        an upper surface bonded to the first adhesive layer and being configured to display a graphical indicia visible through both the clear plastic film and the clear silicone elastomer; and
        a lower surface;
    a second adhesive layer applied to the lower surface of the label stock; and
    a release liner removably attached to the second adhesive layer;
    wherein the release liner is removed and the second adhesive layer is bonded to the exterior surface of the cellular phone.

* * * * *